(12) United States Patent
Hagen (10) Patent No.: US 6,816,924 B2
(45) Date of Patent: Nov. 9, 2004

(54) SYSTEM AND METHOD FOR TRACING ATM CELLS AND DERIVING TRIGGER SIGNALS

(75) Inventor: Gunnar Hagen, Santa Clara, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 286 days.

(21) Appl. No.: 09/734,067

(22) Filed: Dec. 11, 2000

(65) Prior Publication Data

US 2003/0037188 A1 Feb. 20, 2003

Related U.S. Application Data

(63) Continuation-in-part of application No. 09/637,334, filed on Aug. 10, 2000.

(51) Int. Cl.[7] .......................... G06F 13/28; G06F 3/00; G06F 5/00; G06F 15/177

(52) U.S. Cl. ............................ 710/28; 710/22; 710/23; 710/33; 710/36; 710/107; 709/200; 709/212; 711/100

(58) Field of Search ........................ 710/22, 23, 25, 710/26, 27, 28, 107, 33, 36; 709/200, 212; 711/100

(56) References Cited

U.S. PATENT DOCUMENTS

| | | | | |
|---|---|---|---|---|
| 5,185,877 A | * | 2/1993 | Bissett et al. ................. | 710/22 |
| 5,457,681 A | * | 10/1995 | Gaddis et al. ............... | 370/402 |
| 5,687,392 A | * | 11/1997 | Radko .......................... | 710/22 |
| 5,724,609 A | * | 3/1998 | Hatae et al. .................. | 710/22 |
| 5,737,315 A | | 4/1998 | Moritomo | |
| 5,802,287 A | * | 9/1998 | Rostoker et al. ......... | 370/395.5 |
| 5,835,788 A | * | 11/1998 | Blumer et al. ................ | 710/23 |
| 5,845,094 A | * | 12/1998 | Beauchamp et al. ........ | 710/100 |
| 5,878,248 A | * | 3/1999 | Tehranian et al. .......... | 345/502 |
| 6,006,270 A | | 12/1999 | Kobunaya | |
| 6,018,763 A | * | 1/2000 | Hughes et al. .............. | 709/213 |
| 6,026,088 A | * | 2/2000 | Rostoker et al. ....... | 370/395.53 |
| 6,330,623 B1 | * | 12/2001 | Wu et al. ...................... | 710/23 |
| 6,377,998 B2 | * | 4/2002 | Noll et al. ................... | 709/236 |
| 6,477,143 B1 | * | 11/2002 | Ginossar ..................... | 370/230 |
| 2002/0010793 A1 | * | 1/2002 | Noll et al. ................... | 709/240 |

\* cited by examiner

*Primary Examiner*—Jeffrey Gaffin
*Assistant Examiner*—Angel L Casiano
(74) *Attorney, Agent, or Firm*—Fish & Richardson P.C.

(57) ABSTRACT

A trace and debug support unit (120) that works in conjunction with a bus sniffer (112). The trace and debug support unit (120) maintains in memory one or more configurable filter rules which are used to define parameters of the trace history. A plurality of conditions or rules are provided, satisfaction of one or more of which causes a trace history to be filed. A transfer-specific signal may be issued, whereby all cells of the identified transfer are filed as part of the trace history. Alternatively, a connection-specific flag may be carried with each cell, whereby all cells of the specific connection are filed as part of the trace history.

13 Claims, 6 Drawing Sheets

FIG. 6  figure DMA-Request Context

FIG. 7  figure Configuration-cases

FIG. 8

| | Internal Routing Tag 900 | | | | | | | |
|---|---|---|---|---|---|---|---|---|
| | 7 | 6 | 5 | 4 | 3 | 2 | 1 | 0 |
| 0 | Direction-indication | Error-indication | Discard Transfer | IMA Applied | IMA-Group | | | |
| 1 | OAM Extraction | EC-Extraction | Dualcast Applied | Scheduling Applied | Traffic-type ATM/AAL1/ASA2/AAL5 | | Logical Channel | |
| | 902 | | (Logical Channel continued) | | | | | |
| 3 | OAM Listen | Debug-listen | | Reserved | | | RAA (PXB 4226 use) | (PXB 4226 use) |
| 4 | (RAA continued) | | | | | | | |

FIG. 9 Internal Routing Tag

FIG. 10

SYSTEM AND METHOD FOR TRACING ATM CELLS AND DERIVING TRIGGER SIGNALS

CROSS REFERENCE TO RELATED APPLICATIONS

This application is a continuation-in-part of patent application Ser. No. 09/637,334, titled "Interleavement of Frames and Cells," filed Aug. 10, 2000.

BACKGROUND OF THE INVENTION

1. Field of the Invention

The present invention relates to data communication systems and, in particular, to an improved trace and debug system and, particularly, to an improved system for a direct memory access (DMA) handler for an Internet Protocol (IP) over asynchronous transfer mode (ATM) system.

2. Description of the Related Art

The Internet Protocol (IP) is one of the most popular networking protocols in use today. Briefly, IP encapsulates data into packets or frames of varying length. However, IP does not provide true quality of service (QoS), which is a requirement of multimedia messaging. Asynchronous transfer mode (ATM) systems pack data into equal length cells and also provide for true QoS.

Systems that employ IP over ATM must therefore provide for handling of the varying length IP frames and the fixed length ATM cells without doing violence to the ATM QoS requirements. One approach is to receive the IP frames, disassemble them, and reassemble them as ATM cells. This does not necessarily provide an optimal result, however. As such, there is a need for an improved system for handling IP frames and ATM cells.

Further, as can be appreciated, such systems are relatively complex and, as such, it is desirable to provide on-chip trace and debug support.

SUMMARY OF THE INVENTION

These and other drawbacks in the prior art are overcome in large part by a direct memory access device (DMA) in accordance with the present requesters over a shared media by interleaving frames and cells.

A DMA controller according to an implementation of the present invention includes a bus driver, a bus sniffer, a priority controller and a context machine. The bus sniffer is used to identify a cast type of a transfer on the bus, i.e., whether the transfer is a frame or cell transfer. The priority controller asserts a signal allowing access to the bus. The context machine stores system context. The controller supervises interleaving of frames and cells on the bus and asserts a frame end signal when a frame has been transmitted.

A trace and debug support unit is also provided, that works in conjunction with the bus sniffer. The trace and debug support unit maintains in memory one or more configurable filter rules which are used to define parameters of the trace history.

According to one implementation of the invention, a plurality of conditions or rules are provided, satisfaction of one or more of which causes a trace history to be filed. For example, a transfer-specific signal may be issued, whereby all cells of the identified transfer are filed as part of the trace history. Alternatively, a connection-specific flag may be carried with each cell, whereby all cells of the specific connection are filed as part of the trace history.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–10 illustrate an improved system and method for transporting frames and cells. A DMA system includes a plurality of transmit-receive pairs for communicating on a bus. A DMA controller supervises bus handling. The DMA controller includes a priority controller, a bus sniffer, and a context machine. The bus sniffer and context machine identify block transfers as frame or cell transfers and supervise interleaving. The priority controller resolves the priority of each of the constituent transfers of the frame or cell block transfers using a matrix of priority tokens.

A trace and debug support unit is also provided, that works in conjunction with the bus sniffer. The trace and debug support unit maintains in memory one or more configurable filter rules which are used to define parameters of the trace history. A plurality of conditions or rules are provided, satisfaction of one or more of which causes a trace history to be filed. For example, a transfer-specific signal may be issued, whereby all cells of the identified transfer are filed as part of the trace history. Alternatively, a connection-specific flag may be carried with each cell, whereby all cells of the specific connection are filed as part of the trace history.

Call and Frame Interleavement

Figure 1A:
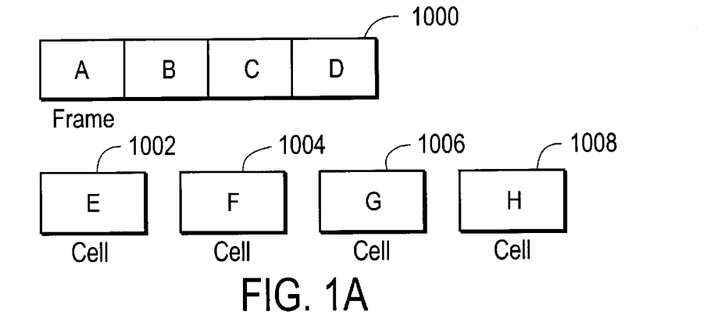
FIG. 1 is a diagram illustrating interleaving of frames and cells according to an implementation of the present invention.

FIG. 1A illustrates a frame 1000 and a plurality of cells 1002, 1004, 1006, 1008. The frame 1000 is of arbitrary length. As will be explained in greater detail below, a frame header includes frame length information, which is used to divide the frame into equal length elements A14 D. The cells 1002, 1004, 1006, 1008 are of fixed length.

Figure 1B:
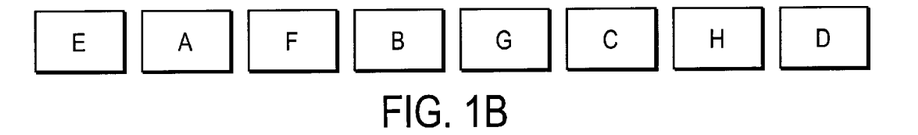

FIG. 1B illustrates interleavement of the frame and cells according to an implementation of the present invention. As will be described in greater detail below, a DMA controller according to an implementation of the present invention provides control signals to interleave the transmission of the frame elements A–D with the cells E–H.

Figure 2:
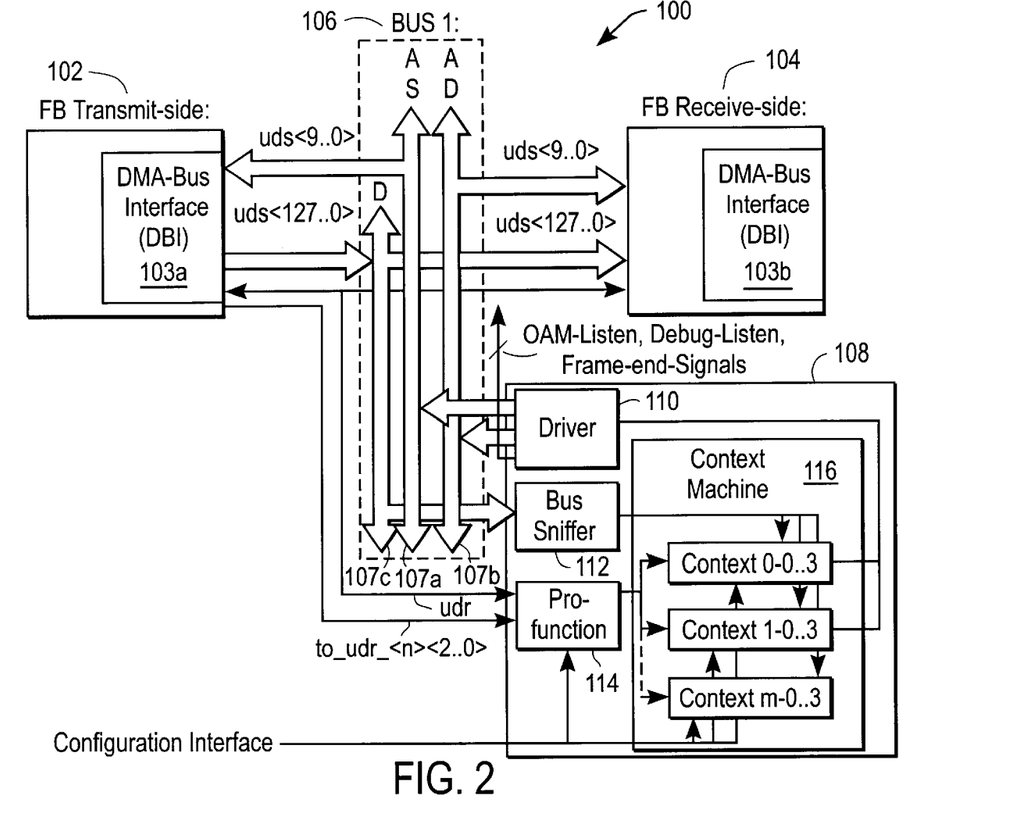
FIG. 2 is a block diagram of a processing system according to an implementation of the invention.

Turning now to the drawings and, with particular attention to FIG. 2, a system 100 according to a particular implementation of the invention is shown therein and generally identified by the reference numberal 100. As shown, the system includes a plurality of functional blocks 102, 104. As will be explained in greater detail below, each functional block 102, 104 includes a DMA bus interface 103*a*, 103*b*, respectively. In operation, one functional block 102 operates as a transmitter and another functional block 104 functions as a receiver. The transmit block and the receive block are referred to collectively as a transfer pair. Typically, the system 100 will include more than one transfer pairs, but only one is shown for sake of simplicity. Thus, the figure is exemplary only.

The system 100 further includes a bus 106 to which the functional blocks 102, 104 are coupled. The bus 102 may be implemented having source address 107*a*, destination address 107*b*, and data 107*c* channels.

Also coupled to the bus 106 is a DMA control unit 108 according to an implementation of the invention. The DMA control unit 108 includes a bus driver 110, a bus sniffer 112, a priority resolver 114, and a context machine 116, as will be explained in greater detail below.

More particularly, on the first transfer of a block transfer, the bus sniffer 112 reads the length field of the frame which is to be transferred, i.e., the parameters frame-length, frame-length descriptor position, and frame-length field size. A down-counter (not shown) is loaded by the frame-length value divided by the number of bytes which are transferred in parallel (i.e., the bus-width). The counter-value is decreased on each transfer. When the downcounter reaches zero (0), a frame-end signal is asserted.

The priority resolver 114 resolves concurrent transfer requests and grants transfer requests on a prereserved basis using tokens. The context machine 116 includes a plurality of registers and determines the associated response to each user data request. The driver 110 drives the bus 106 based on the register contexts. The bus sniffer 112 listens to the first transfer within a block transfer and determines the number of required transfers to complete the block transfer. At the end of the block transfer, the bus sniffer 112 asserts a frame-end signal.

As will be explained in greater detail below, the priority resolver 114 grants a transfer pair access to the bus on a per transfer basis, with a token assigned to each transfer. Thus, for example, with reference to FIG. 1B, each cell E–H and each frame element A–D represents a transfer and has assigned to it an associated token. The priority resolver 115 resolves the priority of any pending transfers. The context machine 116 is used to determine the specific handling of the component transfers of the block transfer(s).

Figure 3:
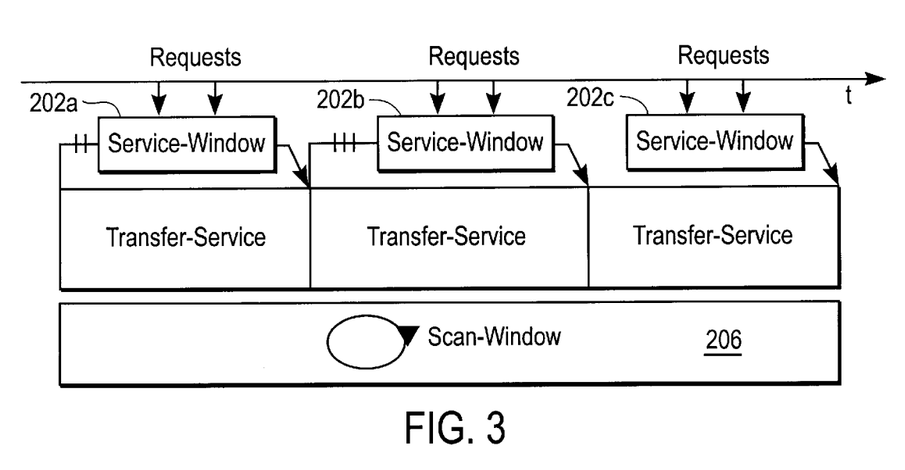
FIG. 3 is a diagram illustrating scan and service windows according to an implementation of the invention.

As noted above, the function of the priority resolver 114 is based on "priority-tokens" and an assignment of "static rank" and "dynamic rank." Transfers are based on the use of the tokens in "scan windows" and "service windows." The tokens allow prereserving bus load share for each transfer-pair. More particularly, FIG. 3 illustrates the use of scan and service windows. Shown are a scan window 206 and a plurality of service windows 202*a*–202*c*. For each service window 202*a*–202*c*, a transfer service, based on the context information, occurs.

A service-window 202 is the time in which the dynamic rank is determined among all pending transfer-requesters. A scan-window 206 is a duration of time having a length equal to n service-windows 202 plus the duration of the performed transfer-services. Even if no requests are made during a service window 202, the service window period will elapse before a next one begins. Thus, each scan window 206 has a minimum duration of n service windows.

As will be explained in greater detail below, priority resolution itself is based on token assignment with reference to "static" and "dynamic" ranks. The static rank is based on a position within a matrix of n+1)=rows) *m+1 (=columns). It is valid for a repetition of scan-window 206. The dynamic rank remains valid only within one service-window 202. Once the static ranking and dynamic ranking are determined, the corresponding transfer-requester is served based on its context-description. Each transfer leads to an "exhaustion" of the used token which will then only be "refreshed" at the beginning of the next scan-window.

Figure 4:
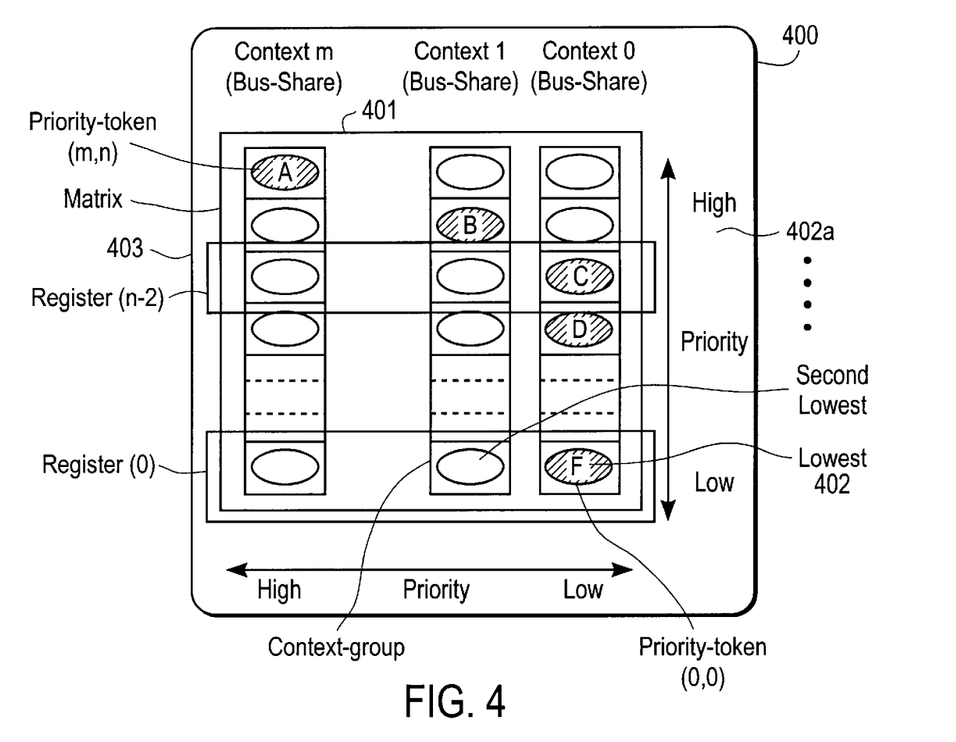
FIG. 4 is a diagram of an exemplary priority token matrix according to an implementation of the invention.

Turning now to FIG. 4, a diagram of an exemplary token matrix 400 is shown. Shown are a plurality of rows 401 and columns 403. The token-column is associated with the context-group of the potential transfer-requesters. Thus there are "m+1" context-groups. The token-rows are associated with the configuration registers of the priority resolver.

The figure depicts (n+1) configuration registers 403 (Level 2) with the register-size (m+1). They form in the logical sense the matrix for the priority tokens. According to one implementation of the present invention, there are three levels of registers for the matrix (and two levels for the remaining context). The registers at level 2 act as the main working registers; the register at level 0 and level 1 act as shadow-register stages. A device-embedded controller (not shown) sets a priority-token by writing a one to the respective bit-position of the register (Level 0)—the Most Significant Bit-positions of the register correspond with the context "m" as and the Least Significant Bit-positions correspond with the context "0".

The highest static rank is at the matrix-position (Column= m| Row=n); the second highest is at the position (Column= m−1; Row=n), continuing down to the lowest static rank available at the matrix-position (Column=0| Row=0). The static rank and priority tokens are assigned upon system configuration via a configuration interface (FIG. 2).

Operation of the priority resolution scheme is illustrated by way of example. As shown in the example of FIG. 4, five (5) priority-tokens have been assigned: Priority-token "A" to transfer-requester "m" (with the corresponding context "m"); Priority-token "B" to transfer-requester 1 (with the corresponding context "1") and Priority-token "C", "D", and "F" to transfer-requester 0 (with the corresponding context 0). It is assumed that the scan-window is just about to start. Next, it is assumed that there were two competing requests scanned within the same service-window: One from transfer-requester 1, one from transfer-requester 0. In the first round the "fresh" tokens with the highest static rank of each context-group are determined. In this example these are the token B and the token C. In the next logical step the static rank of these tokens are compared: Token B has the higher static rank than token C. This results in the highest dynamic rank for the transfer requester 1. Thus the requested transfer is granted and will be executed as described in the related context. Token B remains then "exhausted" for this scan-window—e.g., it is now represented by a reset bit. In the next service-window, the request of transfer-requester 0 will probably be scanned again—as there was no service granted. However it might be that at this time a request of transfer-requester "m" was also scanned which would result in servicing transfer-requester "m" first. If this were not the case the service to transfer-requester 0 would be granted.

Figure 5:
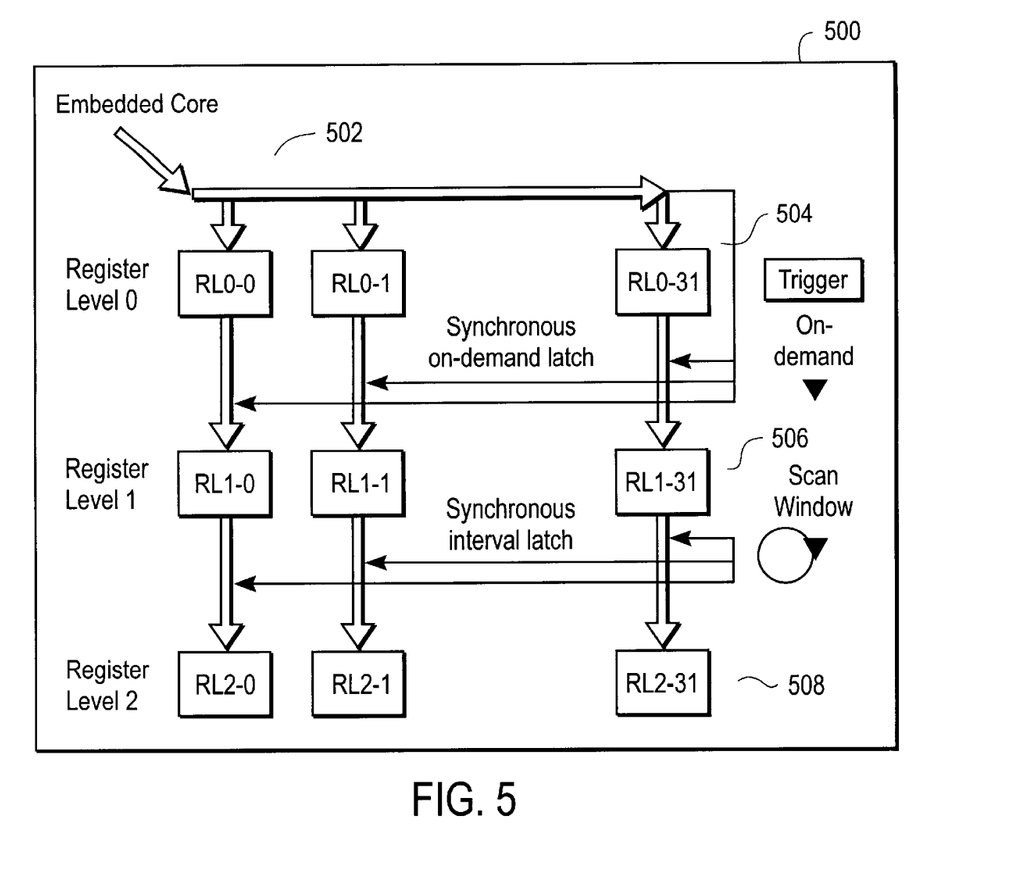
FIG. 5 is a diagram illustrating register stages according to an implementation of the invention.

As noted above, the working register level is Level 2. The register levels 500 are illustrated in FIG. 5. Shown are Register Level 0 (504), Register Level 1 (506), and Register Level 2 (508). The registers 504 of Register Level 0 are sequentially initialized by the embedded controller (not shown) via the configuration interface 502. That is, the desired size of the scan-window is communicated and the context information is initialized. The scan window size may (but need not) correspond to the tokens actually assigned (a different value could be used to compensate a different size of the block-transfers).

Once the initialization is complete, a command-instruction triggers a synchronous latching from the registers 504 of Register Level 0 to the registers 506, 508 at Register Level 1 and Register Level 2, respectively. At the same time the new context-information will be loaded. The scan-window will be reset to start at the service-window "zero".

The registers 508 at Register Level 2 will start performing as the actual working-registers. Once it is determined that a request shall be granted, the corresponding bit is reset by the corresponding logic. All bits are refreshed at the end of the scan-window using the original configuration at Register Level 1. Then a new scan-window will start from the beginning.

Figure 6:
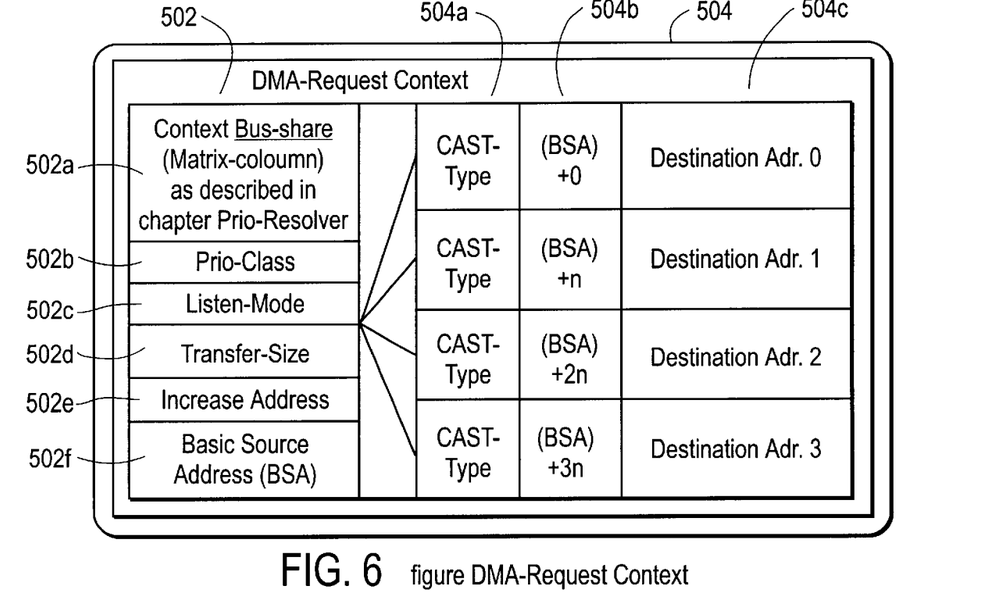
FIG. 6 and FIG. 7 illustrate context assignment according to an implementation of the invention.
Figure 7:
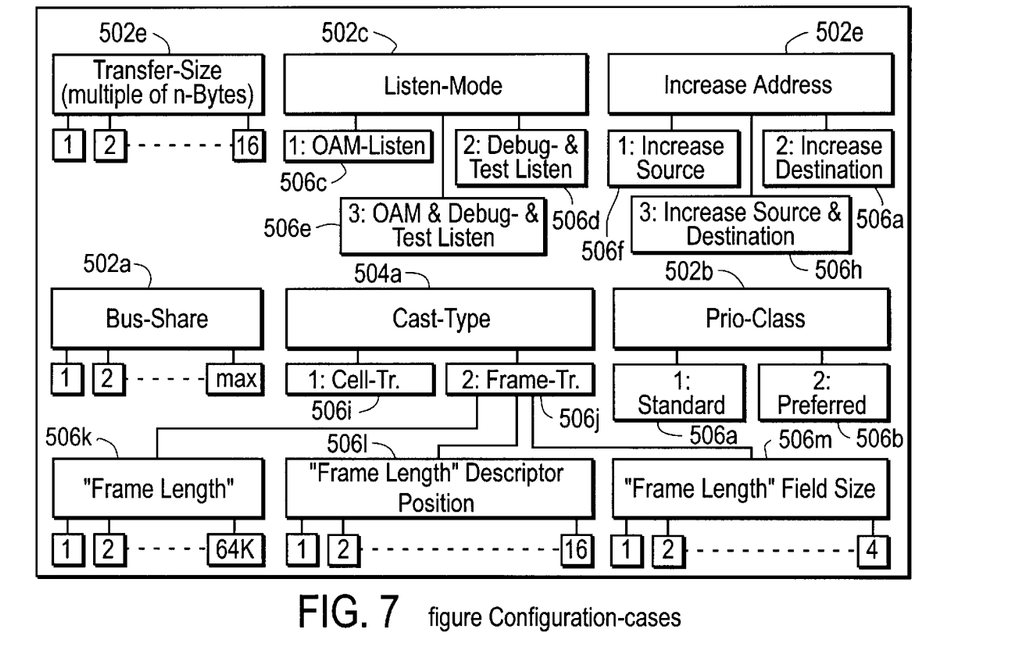

As noted above, context machine 116 determines how the transfer is to be performed. Once a transfer request priority has been resolved, the context associated with the transfer is read. As shown in FIG. 6 and FIG. 7, a transfer request is serviced based on one of six main contexts 502a–f and several dynamically selected subcontexts 504a–d. The main contexts are bus share 502a, priority class 502b, listen-mode 502c, transfer size 502d, increase address 502e, and basic source address (BSA) 502f. The subcontexts are cast type 504a, and four each of static offsets to the basic source address 504b and destination addresses 504c.

The bus share context 502a has been described above and includes a plurality of settings (FIG. 7) to allow reservation of predetermined bus bandwidth.

According to the implementation illustrated, two priority contexts 502b are used: standard 506a and preferred 506b. If standard 506a is used, the priority of a transfer-request will be granted on the basis of an available token with the highest dynamic rank, as described above.

If preferred 506b is used, bus-requests are immediately served. A transfer already started is not interrupted, but the use of the priority matrix does not apply. That means that until the very beginning of the next transfer, decisions based on priority-tokens could be overruled by the transfer-requester with "preferred"-context. If this mode is used one Priority-token less than "n" must be used for the matrix-initialization—the scan-window will remain the same.

Three listen mode values 502c are defined: OAM (Operations, Administration, and Maintenance)—listen 506c, Debug—Listen 506d, and OAM-Listen and Debug—Listen 506e. These signals can be used, e.g., to trigger a statistics-counter (not shown) or for debug-related operations.

OAM-Listen: On related transfers the signal OAM-listen will be asserted.

Debug-Listen: On related transfers the signal Debug-listen will be asserted.

OAM-Listen and Debug-Listen: On related transfers both signals will be asserted.

The transfer size value 506e specifies the block-transfer size, where "n" relates to the buswidth, i.e., how many bytes would be transferred by a single transfer.

The Increase Address value 502e case can be used to increase either source address 506f, increase destination address 506g or increase both addresses 506h within a block-transfer. This can be used for fly-by transfers in conjunction with directly bus-interfaced RAM-areas.

The Basic Source Address value 504b represents the Basic Source Address from which data will be transferred. To this address the offset is added.

The four different static offsets to Basic-Source Address (BSA) 504b describe the statically added offset to the source-address from which data will be transferred.

The four different Destination Addresses 504c describe the addresses to which the data will be transferred.

Two types of cast-types 504a are defined: cell transfer 506i and frame transfer 506j. As described above, when the frame transfer mode is used, the frame transfers are counted using the downcounter, and a frame end signal is asserted when the transfer is complete. The frame elements are then interleaved with cells on the bus, for example, using the priority assignment described above.

The frame length field 506k expresses the frame-length. This information is required to determine when the frame-end signal shall be asserted.

The Frame-length Desriptor position field 506l provides a pointer to a total length or payload length field. More particularly, frame-based protocols (e.g. IP-v4 with the 2-Byte Total Length (TL) or IP-v6 also with a 2-Byte Payload length (PL)) have a field which indicates the frame-length. This field provides a pointer to the beginning of this field to fetch TL/PL.

The frame-length field size field 506m describes the length of the frame length indicator (e.g. in the example listed above 2 Bytes). Offset is internally added to gain the appropriate counter-value.

Trace and Debug Support

As noted above, the present invention also provides a trace and debug support functionality. As will be described in greater detail below, the trace and debut support functionality functions to establish configurable filter rules to implement an efficient limited trace buffer. The present invention thus supports a hierarchical downtracking of possible errors by supporting different logical relations between the conditions set as filter rules.

Figure 8:
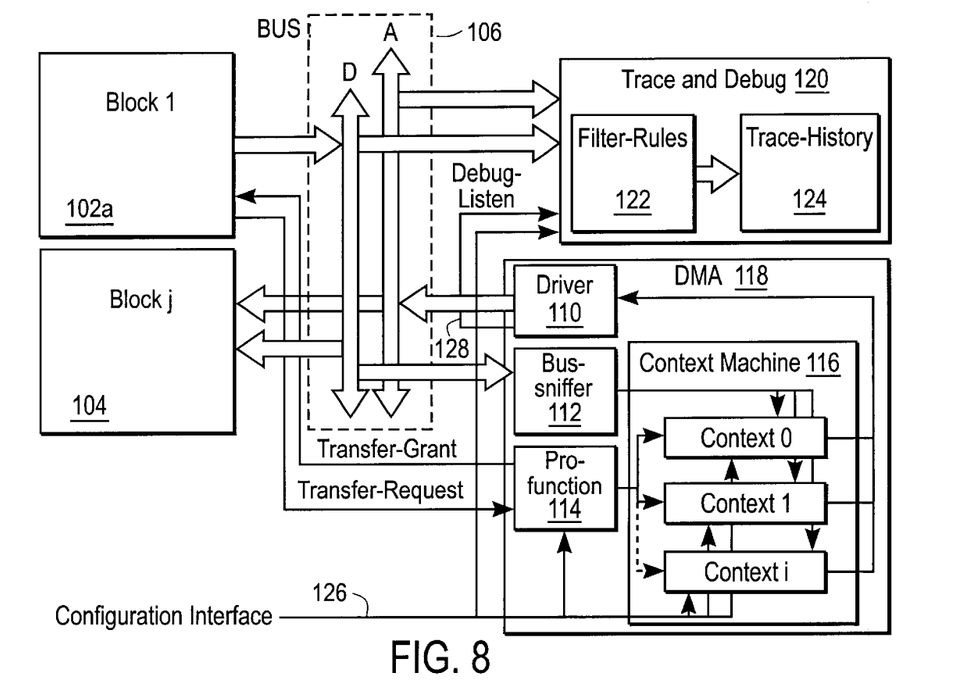
FIG. 8 is a block diagram of a processing system including trace and debug support according to an implementation of the invention.

A block diagram of the system including the trace and debug unit 120 is shown in FIG. 8. The system of FIG. 8 is generally similar to that of FIG. 2, but illustrates the trace and debug support unit 120.

As discussed above, if one functional block needs a cell transfer to another functional block, it issues a transfer request to the DMA control 118. The DMA 118 resolves potentially concurrent requests and performs the transfers based on the configured context information.

The trace and debug support unit 120 includes a filter rules unit 122 and a trace history unit 124. The filter rules unit 122 stores filter rules for storing trace histories in the trace history unit 124. A configuration interface 126 allows the seting of filter rules, and a debug listen signal 128 is provided to control when a trace history should be obtained, as will be explained in greater detail below. The configuration interface 126 links the DMA controller 118 and the trace and debug support unit 120 to an external controller, such as an embedded processor or microcontroller. The configuration interface 126 is used to set or select the trace history mode, as will be explained in greater detail below.

According to an implementation of the invention, trace histories are obtained in one of three modes, based on two filter conditions. One filter rule involves transfer-specific trace history saving. That is, the trace history is saved only during transfers from specific transmit ports (not shown) on specific functional blocks (e.g., 102) to specific receive ports (not shown) on specific functional blocks (104). According to this condition, the DMA context information is set to contain a flag referred to as "DMA Debug-Listen" 506d (FIG. 7). The flag is set by a device controller (not shown) communicating with the DMA block 118 either directly or through the embedded core. If this flag is set, the DMA unit 118 issues a dedicated signal 128 to the Trace and Debug Support unit 120 while the associated transfer is occurring. That is, during the transfer set up and priority resolution procedure described above, the context containing the debug flag is read, and the trace history is obtained if set for the specific transfer.

Figure 9:
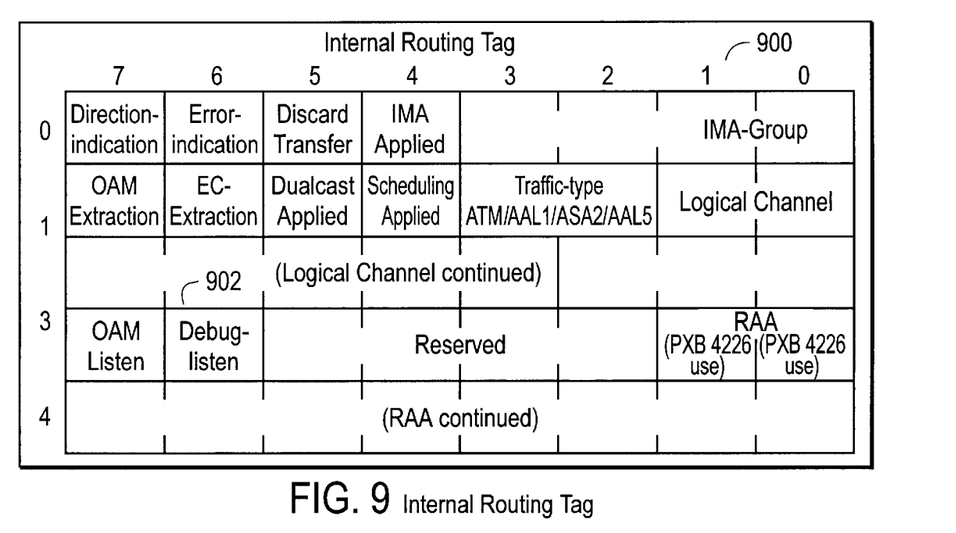
FIG. 9 is a diagram of an exemplary internal routing tag.

A second filter rule or condition involves connection-specific trace saving. That is, every ATM cell belonging to the same ATM connection will be saved. This rule employs a flag in an internal routing tag. More particularly, cells transferred over the internal bus 106 always carry an internal routing tag (IRT). The internal routing flag is illustrated in FIG. 9. As can be seen, the IRT 900 is five byte routing tag that specifies various routing considerations. The IRT 900 further carries a flag 902 called IRT Debug-Listen, set by a device controller (not shown) communicating with the appropriate functional block. As will be explained in greater detail below, the IRT Debug flag is read and, if present, all cells having that flag are traced.

The Trace and Debug Support unit 120 operates in conjunction with the bus sniffer 112. More particularly, the bus sniffer 112 monitors every transfer that occurs on the bus 106. The bus sniffer 112 copies each cell to determine if it should become part of the trace history by evaluating the two conditions described above. If either (or both) of the two conditions are satisfied (according to the commands set in the configuration interface 126), then a trace history is obtained.

That is, in a first mode, if the DMA Context Information contains the DMA Debug Listen flag 506d (FIG. 7), then all of the cells of one or more specific transfers are filed as part of the trace history. In a second mode, if the IRT Debug Listen flag 902 (FIG. 9) is set, then all the cells of the corresponding specific connection(s) are filed as part of the trace history. Finally, in a third mode, if both the DMA Debug Listen flat 506d and the IRT Debug Listen flag 902 are set, then all the cells of the corresponding specific connection(s) on the specific transfer(s) are filed as part of the trace history. As can be appreciated, the ability to set the parameters for obtaining a trace history allows a user to selectively narrow down a "trace window" such that only desired conditions are filed as part of the trace history.

Figure 10:
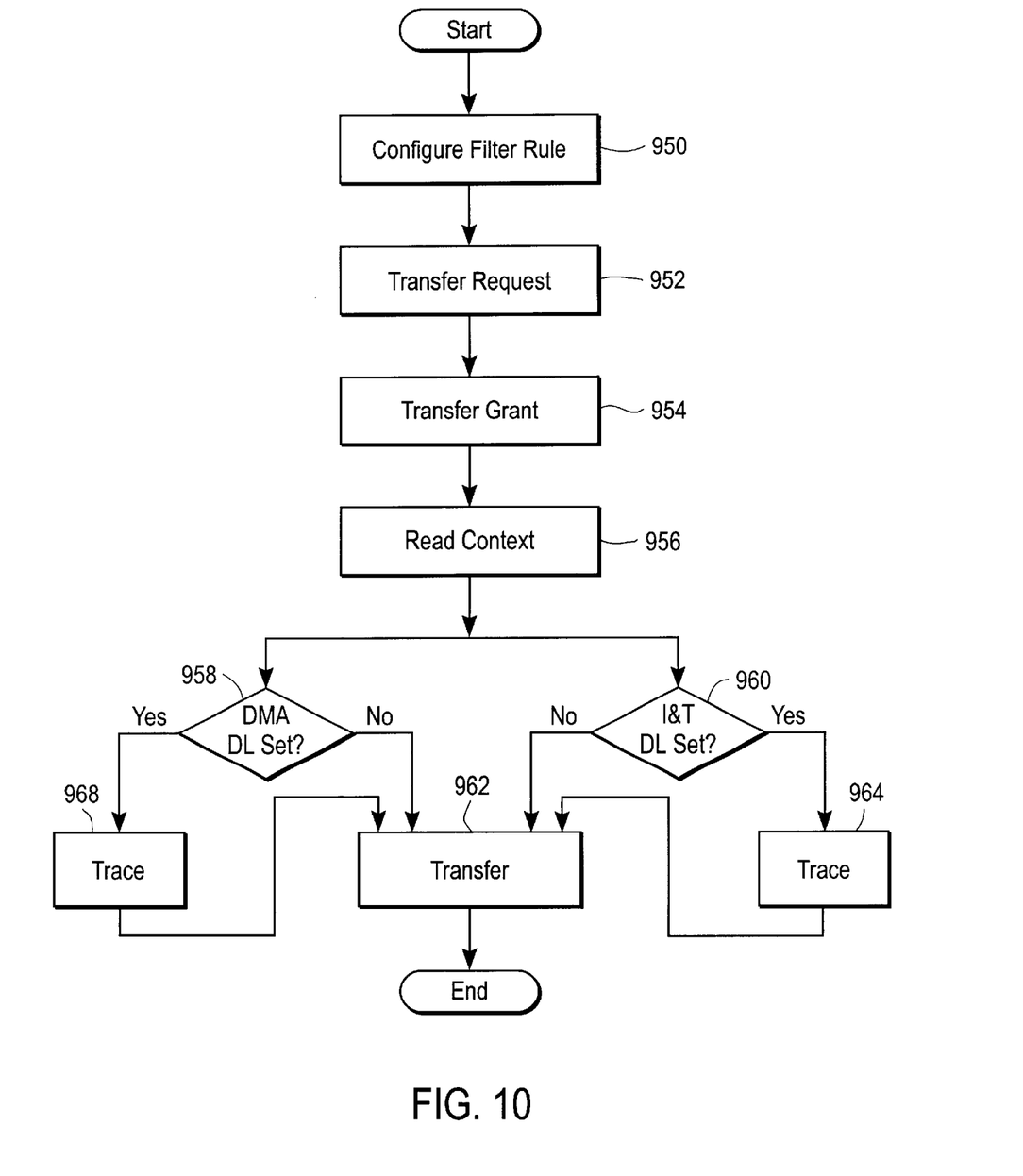
FIG. 10 is a flowchart illustrating operation of an implementation of the invention.

A flowchart illustrating the trace procedure according to an implementation of the present invention is shown in FIG. 10. In a step 950, the filter rules are configured. Thus, the appropriate signals are provided on the configuration interface 126 and stored in the filter rules unit 122. A functional block 102 a then requests a transfer along the transfer request line, in a step 952. The priority resolver 114 determines if the requst can go forward and, if so, issues a transfer grant along the transfer grant line and the context is read, in steps 954 and 956, respectively. In a step 958, it is determined from the DMA context information, whether the DMA Debug Listen flag is set. If so, then a trace of the transfer is activated, in step 968. That is, the debug listen signal 128 is sent to the trace and debug unit 120. Similarly, in step 960, the IRT flag is read from the cells to determine if a trace should be made of the connection. If so, then the Debug Listen signal 128 is asserted, and a trace of the transfer is activated, in step 964. The trace histories are then stored in the trace history unit 124. In either case, or if no trace is to be done, then the transfer then proceeds, in step 962.

Finally, the trace history can be frozen if a signal called Freeze (not shown) is asserted. The trace history can then be read from external devices. For example, the Freeze signal may be asserted if a trace pattern has matched or when the trace buffer is full, or by an external command.

The invention described in the above detailed description is not intended to be limited to the specific form set forth herein, but is intended to cover such alternatives, modifications and equivalents as can reasonably be included within the spirit and scope of the appended claims.

What is claimed is:

1. A system, comprising:
   a filter rules unit adapted to store one or more configurable filter rules for defining a trace history of transfers on a bus, each transfer having one or more associated flags defining how the transfer is to be serviced, the one or more configurable filter rules including,
      a first filter rule designed to capture one or more transfers from one or more pre-determined transmit ports to one or more pre-determined receive ports, the first filter rule being implemented based on a setting of a first flag associated with a given transfer, and
      a second filter rule designed to capture one or more transfers of a connection, the second filter rule being implemented based on a setting of a second flag associated with a given transfer; and
   a DMA controller adapted to monitor each transfer and evaluate whether one or both of the first and second flags are set within a given transfer, wherein
      if the first flag is set within a given transfer, then the transfer is filed as part of a trace history as being transmitted from the one or more pre-determined transmit ports to the one or more pre-determined receive ports,
      if the second flag is set within a given transfer, then the transfer is filed as part of the trace history as being associated with the connection,
      if both the first and second flags are set within a given transfer, then the transfer is filed as part of the trace history as being transmitted from the one or more pre-determined transmit ports to the one or more pro-determined receive ports and being associated with the connection; and
   a trace history unit adapted to store the trace history.

2. A system in accordance with claim 1, wherein the first flag is set within DMA context information associated with a given transfer, and wherein the DMA controller is adapted to identity whether the first flag is set within the DMA context information of a given transfer and issue a debug listen signal if the first flag is identified.

3. A system in accordance with claim 2, wherein die second flag is set within an internal routing tag associated with a given transfer, and wherein the DMA controller is adapted to determine whether the second flag is set within the internal routing tag of a given transfer.

4. A system in accordance with claim 1, further comprising a configuration interface adapted to set each of the one or more configurable filter rules of the filter rules unit.

5. A system in accordance with claim 1, further comprising a device adapted to assert a freeze signal and freeze the trace history if the trace history contains a match to a pre-determined trace pattern.

6. A direct memory access system, comprising;
   a bus;
   a plurality of functional blocks coupled to the bus;

a filter rules unit adapted to store one or more configurable filter rules for defining a trace history of transfers on the bus, each transfer having one or more associated flags defining how the transfer is to be serviced, the one or more configurable filter rules including,
- a first filter rule designed to capture one or more transfers from one ore more pre-determined transmit ports to one or more pre-determined receive ports, the first filter rule being implemented based on a setting of a first flag associated with a given transfer, and
- a second filter rule designed to capture one or more transfers of a connection, the second filter rule being implemented based on a setting of a second flag associated with a given transfer;

a DMA controller coupled to the bus, the DMA controller adapted to monitor transfers between the functional blocks on the bus, the DMA controller to evaluate whether one or both of the first and second flags are set within a given transfer, wherein
- if the first flag is set within a given transfer, then the transfer is filed as part of a trace history as being transmitted from the one or more pre-determined transmit ports to the one or more pre-determined receive ports,
- if the second flag is set within a given transfer, then the transfer is filed as part of the trace history as being associated with the connection,
- if both the first and second flags are set within a given transfer, then the transfer is filed as part of the trace history as being transmitted from the one or more pre-determined transmit ports to the one or more pre-determined receive ports and being associated with the connection; and a trace history unit adapted to store the trace history.

7. A direct memory access system in accordance with claim 6, wherein the first flag is set within DMA context information associated with a given transfer, and wherein the DMA controller is adapted to identify whether the first flag is set within the DMA context information of a given transfer and issue a debug listen signal if the first flag is set.

8. A direct memory access system in accordance with claim 7, wherein the second flag is set within an internal routing tag associated with a given transfer, and wherein the DMA controller is adapted to determine whether the second flag is set within the internal routing tag of a given transfer.

9. A direct memory access system in accordance with claim 6, further comprising a configuration interface adapted to set each of the one or more configurable filter rules of the filter rules unit.

10. A method comprising:
configuring one or more filter rules for defining a trace history of transfers on a bus including,
- configuring a first filter rule designed to capture one or more transfers from one or more pre-determined transmit ports to one or more pre-determined receive ports by setting a first flag associated with a given transfer, and
- configuring a second filter rule designed to capture one or more transfers of a
connection by setting second flag associated with a given transfer;
monitoring transfers on a bus including evaluating whether one or both of the first and second flags arc set within a given transfer, wherein
- if the first flag is set within a given transfer, then filing the transfer as part of a trace history as being transmitted from the one or more pre-determined transmit port to the one or more pre-determined receive ports,
- if the second flag is set within a given transfer, then filing the transfer as part of the trace history as being associated with the connection, and
- if both the first and second flags are set within a given transfer, then filing the transfer as part of the trace history as being transmitted from the one or more pre-determined transmit ports to the one or more pre-determined receive ports and being associated with the connection; and
storing the trace history.

11. A method in accordance with claim 10, wherein setting a first flag includes setting a first flag within DMA context information associated with a given transfer, and wherein monitoring transfers on a bus comprises monitoring whether the first flag is set within the DMA context information of a given transfer.

12. A method in accordance with claim 11, wherein setting a second flag includes setting a second flag within an internal routing tag associated with a given transfer, and wherein monitoring transfers on a bus comprises monitoring whether the second flag is set within the internal routing tag of a given transfer.

13. A method according to claim 10, further comprising freezing the trace history if the trace history contains a match to a pre-determined trace pattern.

* * * * *

UNITED STATES PATENT AND TRADEMARK OFFICE
CERTIFICATE OF CORRECTION

PATENT NO. : 6,816,924 B2
DATED : November 9, 2004
INVENTOR(S) : Gunnar E. Hagen It is certified that error appears in the above-identified patent and that said Letters Patent is hereby corrected as shown below:

Column 8,
Line 53, change "die" to -- the --.

Column 9,
Line 7, change "ore" to -- or --.

Signed and Sealed this

Twenty-eighth Day of June, 2005

JON W. DUDAS
*Director of the United States Patent and Trademark Office*